(12) United States Patent  (10) Patent No.: US 7,654,849 B2
Gordon et al.  (45) Date of Patent: Feb. 2, 2010

(54) RELEASABLY LOCKING AUTO-ALIGNING FIBER OPTIC CONNECTOR

(75) Inventors: Mark G. Gordon, San Clemente, CA (US); Weldon D. West, Mission Viejo, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 0 days.

(21) Appl. No.: 12/049,125

(22) Filed: Mar. 14, 2008
(Under 37 CFR 1.47)

(65) Prior Publication Data
US 2009/0042432 A1 Feb. 12, 2009

Related U.S. Application Data

(60) Provisional application No. 60/896,475, filed on Mar. 22, 2007.

(51) Int. Cl.
*H01R 13/627* (2006.01)
(52) U.S. Cl. ....................................................... 439/350
(58) Field of Classification Search ................. 439/350, 439/378, 138; 385/58, 60, 70, 72, 75, 78
See application file for complete search history.

(56) References Cited

U.S. PATENT DOCUMENTS

| | | | |
|---|---|---|---|
| 5,708,745 A * | 1/1998 | Yamaji et al. .................. | 385/92 |
| 6,425,692 B1 * | 7/2002 | Fujiwara et al. ............... | 385/56 |
| 6,461,054 B1 * | 10/2002 | Iwase .......................... | 385/73 |
| 6,595,696 B1 * | 7/2003 | Zellak .......................... | 385/72 |
| 6,609,833 B1 | 8/2003 | Miyachi et al. | |
| 6,685,362 B2 * | 2/2004 | Burkholder et al. ........... | 385/78 |
| 6,715,930 B2 * | 4/2004 | McBride ....................... | 385/73 |
| 6,755,574 B2 * | 6/2004 | Fujiwara et al. ............... | 385/56 |

(Continued)

FOREIGN PATENT DOCUMENTS

DE 19951159 A1 4/2001

(Continued)

OTHER PUBLICATIONS

European Patent Office as the International Searching Authority, Annex to Communication Relating to the Results of the Partial International Search, PCT/US2008/057846, Oct. 16, 2008.

(Continued)

*Primary Examiner*—Jean F Duverne
(74) *Attorney, Agent, or Firm*—Gregory J. Carlin (57) ABSTRACT

A connector assembly couples signal lines for an optical catheter by providing a guided releasable latching mechanism that ensures optimal alignment with only a single vertical dimension under control. A receptacle carrying a first signal line defines a channel for receiving a plug carrying a second signal line. A spring-loaded pawl on the receptacle locks to a retaining bracket on the plug when the plug slides into the channel, imparting a retaining force on the plug, the force having a first component normal to channel and a second component parallel to the channel to maintain the first and second signal lines in optimal alignment. The retaining bracket may include a sloped edge to allow for easy release of the pawl in the presence of a release force. The release force may be set to allow disconnection of the assembly without affecting catheter installation or causing patient discomfort.

20 Claims, 5 Drawing Sheets

U.S. PATENT DOCUMENTS

| | | | |
|---|---|---|---|
| 6,764,222 B1 * | 7/2004 | Szilagyi et al. | ............... 385/55 |
| 2002/0052149 A1 * | 5/2002 | Suzuki et al. | ............... 439/668 |
| 2004/0002243 A1 | 1/2004 | Mellott et al. | |
| 2004/0062487 A1 | 4/2004 | Mickievicz | |
| 2004/0223701 A1 | 11/2004 | Tanaka et al. | |

FOREIGN PATENT DOCUMENTS

| | | | |
|---|---|---|---|
| EP | 0837347 | A2 | 4/1998 |
| EP | 0973052 | A2 | 1/2000 |
| EP | 1143275 | A2 | 10/2001 |
| EP | 1486808 | A2 | 12/2004 |

OTHER PUBLICATIONS

International Search Report for PCT/US2008/057846, dated Feb. 17, 2009.

\* cited by examiner

RELEASABLY LOCKING AUTO-ALIGNING FIBER OPTIC CONNECTOR

CLAIM OF PRIORITY UNDER 35 U.S.C. §119

The present application for patent claims priority to Provisional Application No. 60/896,475 filed Mar. 22, 2007, and assigned to the assignee hereof and hereby expressly incorporated by reference herein.

FIELD OF THE INVENTION

The invention relates generally to connectors for fiber optic instruments. More particularly, the invention relates to a module for coupling an optical instrument to an optical measurement device that may be disposed within a catheter.

BACKGROUND

Optical instruments such as endoscopic imaging devices have been used in medical applications for many years. A common technique for performing minimally invasive imaging involves placement of the imaging device inside a catheter, such as a central venous catheter, which then carries the imaging device to a desired intravenous location. Due to space constraints encountered when inserting these devices into a patient, the size of the imaging transducer is designed to be as small as possible. Thus, electronic components used to process transducer signals are located remotely from the catheter and are typically coupled to the transducer by running cable or optical fiber through the catheter.

Figure 1:
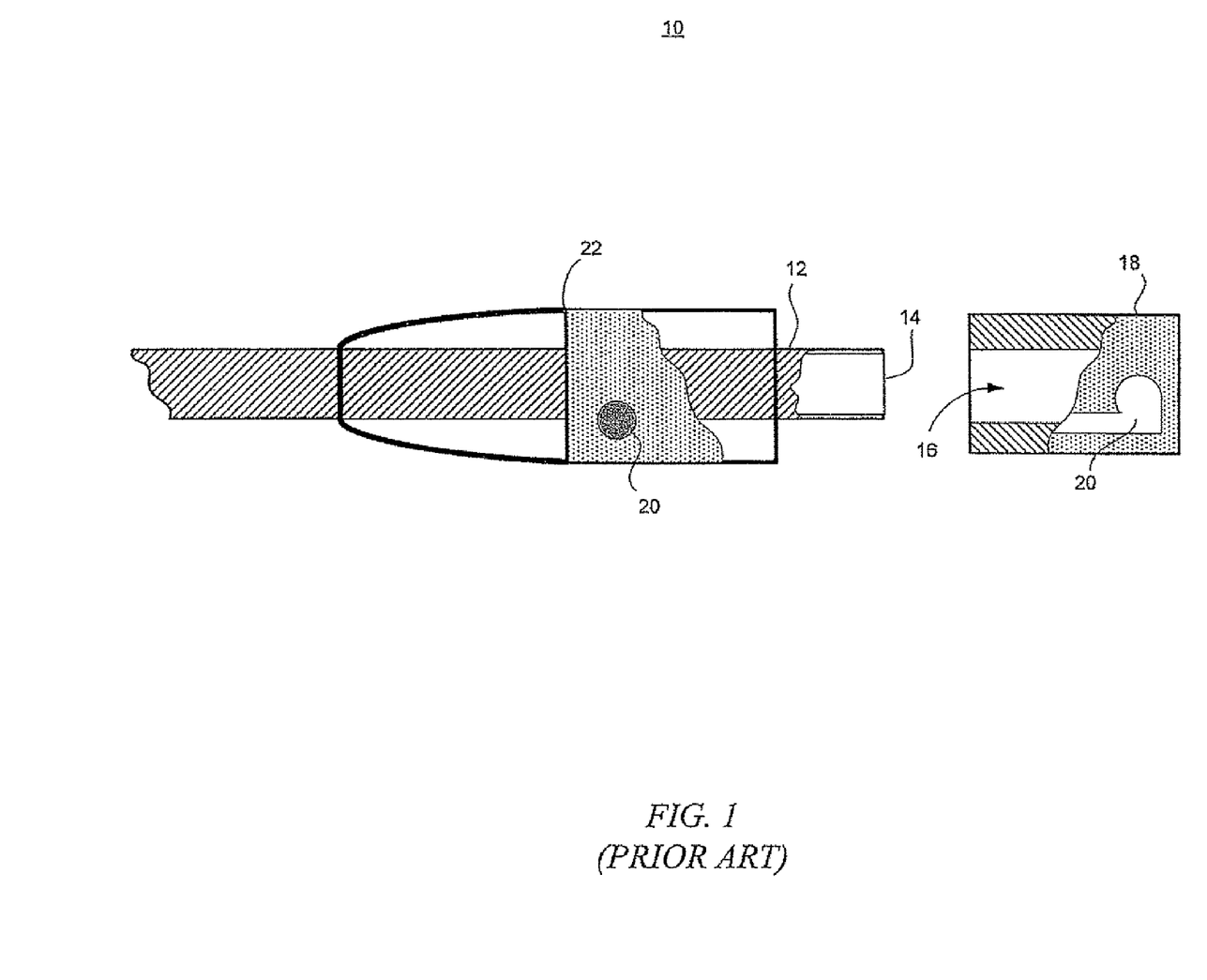
FIG. 1 is a typical prior art fiber optic connector assembly with a bayonet-type locking device.

To ensure a good connection between connecting ends of an optical fiber, connectors are typically designed with cylindrical ferrules suspended within a connector body. A typical fiber optic connector 10 is shown in FIG. 1. The ferrule 12 is bored through the center at a diameter that is slightly larger than the diameter of the fiber 14. The fiber 14 is then fed through the ferrule 12, so that the end of the fiber 14 coincides spatially with the end of the ferrule 12. During coupling, the ferrule 12 guides the end of the fiber 14 into an alignment sleeve 16 of a mating receptacle 18. A locking mechanism 20 may be formed on the outside of the receptacle 18 and the connector body 22 to hold the mated pair securely together. Because the diameter of the fiber 14 may be on the order of 10 µm, very tight dimensional tolerances are required for those components of the connector assembly that are responsible for aligning the fibers.

The locking mechanism 20 is typically a bayonet type connection, a threaded sleeve connection, or other locking device that prevents the mated ends from becoming uncoupled in the presence of a pulling force or tension across the connection. The locking mechanism 20 helps to maintain proper alignment of the mating ends of the fiber 14 to minimize insertion loss across the connection. The locking mechanism 20 also helps to ensure the integrity of the optical transmission path when the connection is under tension. Locking connectors may be critical for applications such as telecommunications, security, and other data transmission systems that require very high reliability.

In medical applications, however, it may not be desirable to maintain a locked connection, even in the presence of tension across the connection. This is especially true in the case of an imaging device or other measuring device or sensor that is inserted into a patient through an intravenous catheter. For example, when an electronics module or instrument rack connected to the catheter leads is moved or falls over, it can pull the catheter leads with it. Excessive tension placed on the catheter leads or other connective cable may cause considerable discomfort to the patient, displacement of the catheter, or in the worst case, removal of the catheter from the patient access site.

SUMMARY

The invention discloses a connector assembly for coupling signal lines, such as optical fibers, connected between an optical instrument and an optical sensor installed inside a catheter. The connector assembly provides a releasably locking auto-aligning mechanism for mechanically coupling signal lines and properly aligning them for minimum insertion loss.

A plug and receptacle cooperate to create the releasably locking mechanism. The receptacle may include a terminating end for terminating a first signal line and a receiving end for receiving the plug, and the plug may carry a second signal line for coupling to the first signal line. The receptacle may include a housing that defines a channel having a planar surface disposed in the receiving end. A baffle, through which the first signal line extends, may be positioned between the terminating end and the receiving end of the receptacle in a direction normal to the surface of the channel. A rotatable spring-loaded pawl may be mounted on the receptacle above the channel. The rotatable pawl may have a rear end for compressing a spring and a tapered end with a barbed edge. The plug may include a retaining bracket sized and positioned to engage the tapered end of the pawl when the plug slides into the channel. At full engagement, the barbed edge of the pawl may lock against the retaining bracket and impart a retaining force on the plug, the retaining force having a first component normal to the planar surface of the channel, and a second component normal to the baffle, to maintain the first and second signal lines in optimal alignment. The mating end of the plug may be wedge-shaped to help guide the plug into the receptacle channel. The baffle may include an alignment knob that mates with a recess set into the mating end of the plug. The retaining bracket may include a sloped edge to allow for easy release of the barbed edge of the pawl in the presence of a release force.

With the connector assembly in a locked state, the first component of the retaining force pushes the mating end of the plug horizontally against the baffle. If a mechanical shock misaligns the connection, the first component provides a restoring force to restore the connection. As the second component of the retaining force pushes the plug downward against the channel, optimal vertical alignment may depend on only a single height dimension. In an optical catheter application, the release force of the locking mechanism may be set to a value less than the force required to pull the catheter out of a patient, to ensure disconnection without affecting catheter installation or causing patient discomfort.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Figure 2:
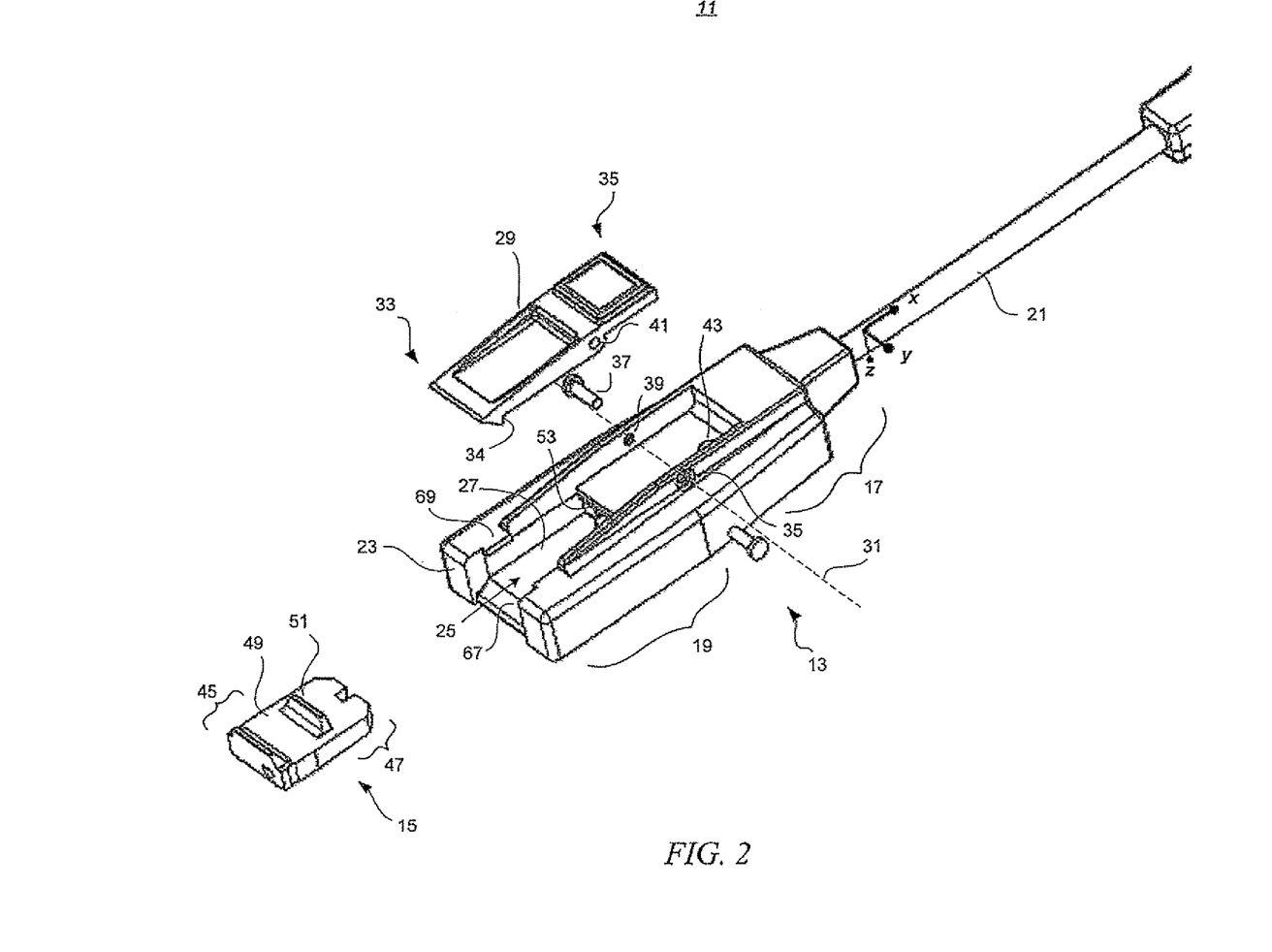
FIG. 2 is an exploded top isometric view of a connector assembly according to an embodiment of the invention.

The invention provides a coupling device for medical applications that maintains proper alignment for an optical connection while allowing for easy release from the catheter without disturbing the patient access site. FIG. 2 shows an isometric drawing of a connector assembly 11 according to an embodiment of the invention. The connector assembly 11 includes a receptacle 13 and a plug 15. The receptacle 13 and the plug 15 may be made of a rigid dielectric material such as a molded plastic. The receptacle 13 and the plug 15 each terminate a signal line and when mechanically engaged in proper alignment cooperatively couple the signal lines to ensure signal transmission across the coupling junction with minimal insertion loss.

The receptacle 13 includes a terminating end 17 and a receiving end 19. The terminating end 17 receives and terminates a signal line 21. In one embodiment, the signal line 21 is a fiber optic line having one or more optical fibers. In other embodiments, the signal line 21 may be a conductive cable, providing one or more conductive paths of single or multi-stranded wire. The receiving end 19 is configured to receive and engage with the plug 15.

The receptacle 13 includes a housing 23 that defines a channel 25 disposed in the receiving end 19. The channel 25 includes a planar surface 27 that serves as a contacting plane for receiving the plug 15 and guiding it into engagement with the receptacle 13. The channel 25 extends in a longitudinal direction, which is the x-direction as indicated in the figure, The receptacle 13 also includes a pawl 29 mounted to the housing 23. The pawl 29 is positioned above or opposite the channel 25, as shown.

The pawl 29 includes a tapered end 33 and an anchoring end 35 and may be made of a rigid material such as metal or plastic. The tapered end 33 may include a barbed edge 34. In one embodiment, the pawl 29 is rotatable about an axis 31 oriented transversely to the channel 25, i.e. in the y-direction. A pin 37 is used to rotatably fasten the pawl 29 to the housing 23 through mounting holes 39 and 41 such that the pin 37 aligns concentrically with the axis 31. In another embodiment, the pawl 29 may be formed as a flexible component and may be fixed at the anchoring end 35 to the terminating end 17 of the housing 23, such that a free length of the pawl 29 may flex to allow for displacement of the tapered end 33.

In the connector assembly 11, the housing 23 includes a spring 43 disposed in the terminating end 17 and positioned to contact the anchoring end 35 of the pawl 29 as the pawl 29 rotates downward and in a clockwise direction. The spring 43 may be a spring such as a steel helical-wound compression spring, and may include a cap (not shown) for contacting the anchoring end 35 of the pawl 29. The spring 43 may assume other forms, such as one or more tension, leaf or cantilever springs, mounted appropriately to the housing 23.

The plug 15 includes a terminating end 45 and an insertion end 47. The terminating end 45 terminates a signal line. The insertion end 47 engages the receptacle 13. A top side 49 of the plug 15 may be configured with a retaining bracket 51. A bottom side of the plug 15, or channel contacting surface (see FIG. 2), may be configured for sliding onto the planar surface 27 of the channel 25.

With the connector assembly 11 so configured, the receptacle 13 and the plug 15 may be coupled together by sliding the insertion end 47 of the plug 15 into the receiving end 19 of the receptacle 13 through the channel 25. As the plug 15 is drawn into the channel 25, the tapered end 33 of the pawl 29 engages the retaining bracket 51, forcing the tapered end 33 to rotate upward while the anchoring end 35 rotates downward to compress the spring 43, thereby placing a spring load on the pawl 29. When the barbed edge 34 travels beyond the retaining bracket 51, the spring 43 releases, forcing the barbed edge 34 downward to snap-lock the pawl 29 to the retaining bracket 51 and urge the plug 15 further into the channel 25. In this position, also referred to as the fully engaged position, the barbed edge 34 under pressure from the spring 43, maintains a retaining force on the plug 15 to keep the first and second signal lines in proper alignment and lock the plug 15 to the receptacle 13.

Figure 3:
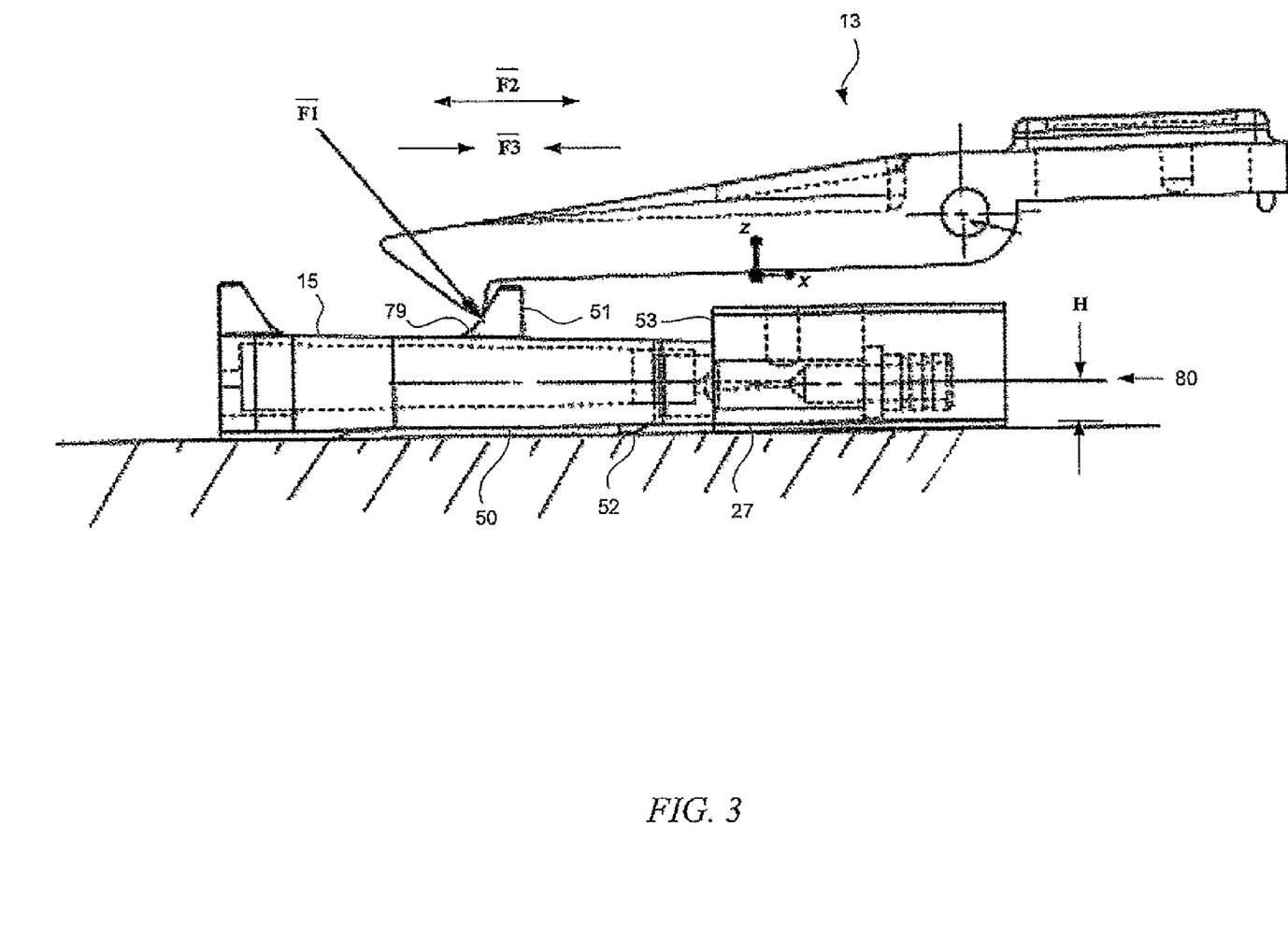
FIG. 3 is a transparent side view of a connector assembly showing the assembly in a fully engaged position according to an embodiment of the invention.

FIG. 3 shows the connector assembly 11 in a fully engaged position. The retaining force on the plug 15 is indicated by force vector F1. In one embodiment, the force vector (or retaining force) F1 has a first component in the z-direction that is normal to the planar surface 27 and a second component in the x-direction that is parallel to the planar surface 27. Thus, with respect to the coordinate system shown, the retraining force F1 acts in at least two orthogonal directions. A result of the force vector F1 acting on the plug 15 is that the plug 15 is forced downward against the planar surface 27 by the first force component, and inward to engage the receptacle 13 by the second force component.

Advantageously, by ensuring a downward-acting force that presses a bottom surface of the plug 15 against the planar surface 27, optimal vertical alignment of the first signal line with the second signal depends on a single height dimension. That is, for manufacturing purposes, proper alignment of the signal lines may be determined by controlling the height of each signal line (i.e. the displacement in the z-direction) above the planar surface 27.

In addition, by ensuring an inward-acting force that urges the insertion end 47 of the plug 15 into the receptacle 13, optimal positioning along the x-direction may also be achieved. The receptacle 13 further includes a baffle 53 positioned between the terminating end 17 and the receiving end 19, as shown in the figures. The baffle 53 extends from the planar surface 27 in the z-direction, i.e. in a direction substantially normal to the planar surface 27 of the channel 25. Thus, the baffle 53 provides a flat or limiting surface facing the receiving end 19 of the receptacle 13 to limit movement of the plug 15 in the x-direction. In the fully engaged position, the insertion end 47 of the plug 15 abuts the baffle 53.

Figure 4:
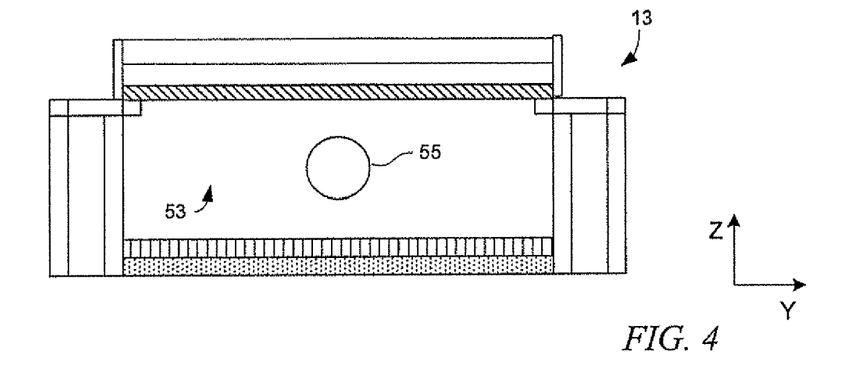
FIG. 4 is a frontal view of a receptacle of a connector assembly according to an embodiment of the invention.
Figure 5:
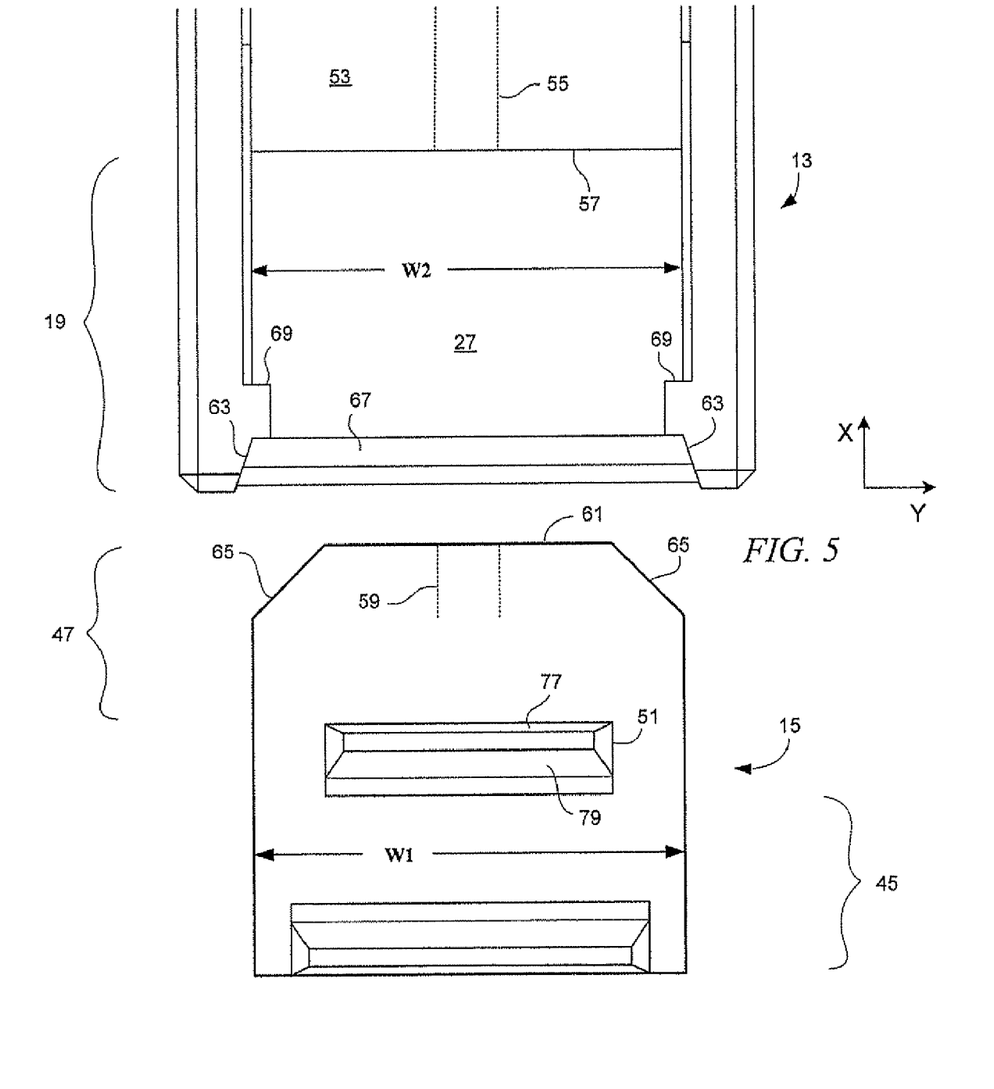
FIG. 5 is a partial top view of a connector assembly showing the assembly in a non-engaged position according to an embodiment of the invention.

As shown in FIGS. 4 and 5, the baffle 53 further includes a hole or throughway 55 for passing an end of the first signal line 21. In one embodiment, the first signal line 21 extends through the hole 55 until it is flush with the limiting surface of the baffle 53, forming a planar engagement surface 57 for abutting to the plug 15. Within the plug 15, the second signal line similarly passes through a hole 59 to form a planar engagement surface 61 on the insertion end 47. Thus, in the fully engaged position, the planar engagement surface 57 abuts the planar engagement surface 61, coupling the end of the first signal line to the end of the second signal line to complete the connection.

Horizontal alignment (i.e. in the y-direction) of the signal lines may be accomplished using additional geometric features on both the plug 15 and the receptacle 13. At the receiving end 19, the receptacle 13 is formed with angled walls 63 that form a maximum channel width at a position furthest from the baffle 53. The angled walls 63 lie in the x-y plane and may assist in guiding the plug 15 properly into the receptacle 13. Similarly, at the insertion end 47, the plug 15 is formed with the walls 65 angled in the x-y plane for guiding the plug 15 into the receptacle 13. The angled walls 63 and 65 facilitate engagement, for example, when the connector assembly 11 is connected by hand.

The angled walls 63 may be formed such that the maximum distance between them in the y-direction is greater than the maximum width W1 of the plug 15. The minimum distance in the y-direction between the angled walls 63 approaches the width W2 as the angled walls 63 merge into the channel 25. In the embodiment of FIGS. 4 and 5, the horizontal alignment in the y-direction at full engagement is met by providing a width W2 sized to snugly accommodate width W1 of the plug 15. The snug accommodation means that the plug 15 may be fully inserted into the receptacle 13 without excessive friction against the walls of the channel 25 and without allowing any displacement in the y-direction at full engagement. The nominal difference between widths W1 and W2 may be established according to desired manufacturing accuracy and tolerances. For aligning electrical cable, for example, the difference may be set between about 0.1 mm and about 0.01 mm. In an embodiment for aligning optical fiber, the nominal difference between W1 and W2 may be on the order of about 100 micrometers. In another embodiment, the nominal difference may be on the order of about 10 micrometers.

The vertical alignment (i.e. in the z-direction) may also be facilitated by various geometric features. In one embodiment during engagement of the plug 15 and the receptacle 13, an angled shelf 67 and an upper stop 69 assist a user by guiding the insertion end 47 into the receiving end 19 at an approximately correct vertical alignment for initial entry of the plug 15 into the channel 25.

Figure 6:
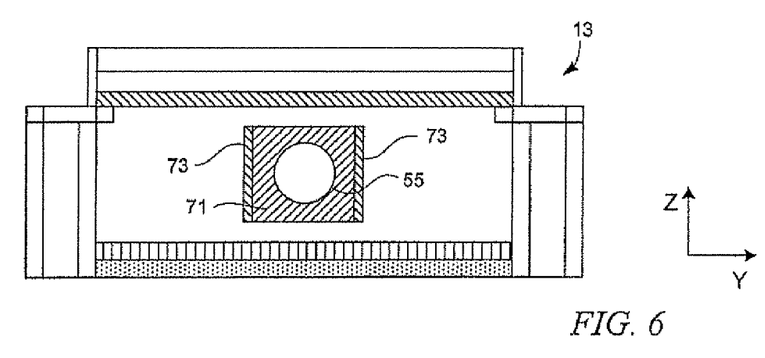
FIG. 6 a frontal view of a receptacle of a connector assembly according to another embodiment of the invention.
Figure 7:
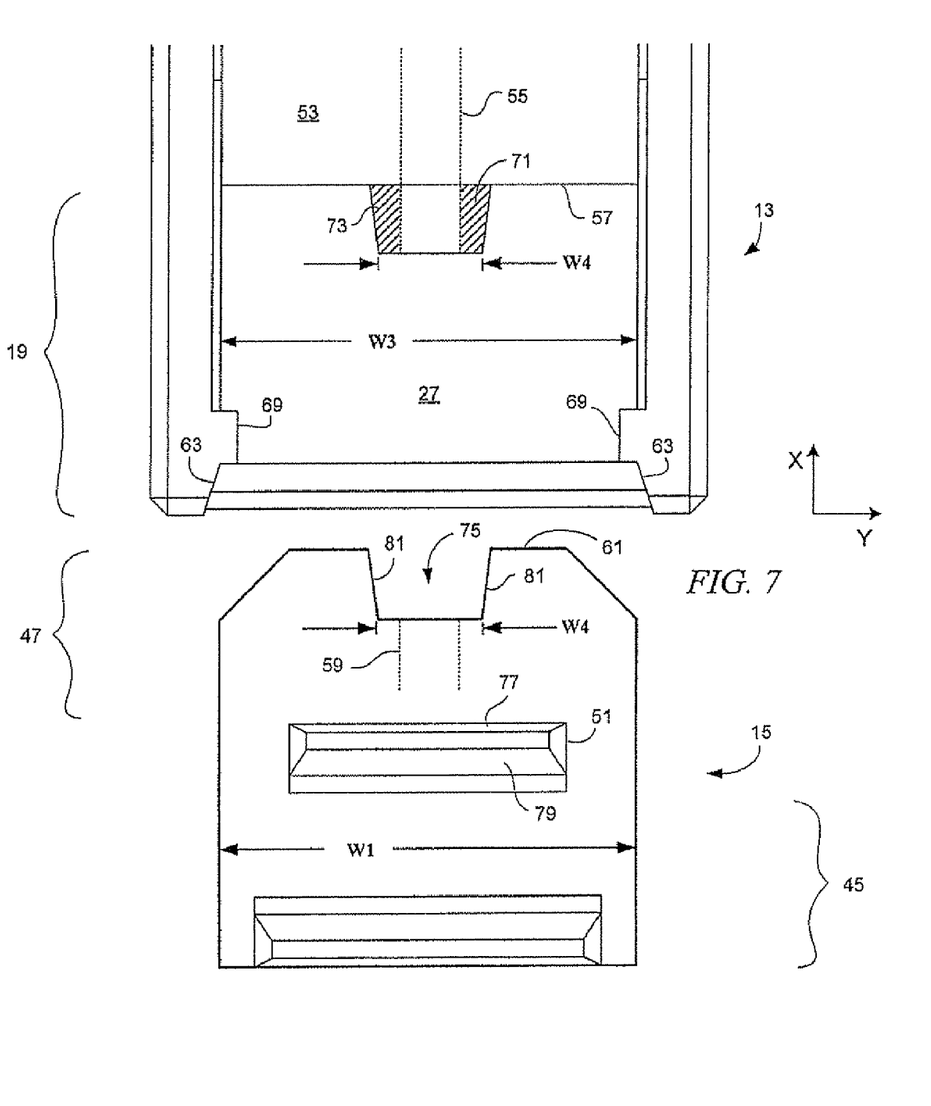
FIG. 7 is a partial top view of a connector assembly showing the assembly in a non-engaged position according to another embodiment of the invention.

In the embodiments of FIGS. 6 and 7, the receptacle 13 may be configured with an alignment knob 71 that protrudes from the baffle 53 in a longitudinal direction. The hole 55 may extend all the way through the alignment knob 71 as shown. The alignment knob 71 may be formed as an integral part of the baffle 53, or it may be separately attached thereto. The alignment knob 71 is further configured with the angled sides 73 to assist in aligning the insertion end 47 of the plug 15 as it approaches full engagement. On the plug 15, a recess 75 may be configured in the insertion end 47 to receive the alignment knob 71.

In one embodiment, the recess 75 may include sloped sides 81 that form a maximum recess width at an outer edge of the insertion end 47 and a minimum recess width W4 along an inner wall of the recess 75 nearest the terminating end 45. At full engagement, when the planar engagement surface 57 abuts the planar engagement surface 61, the alignment knob 71 extends fully into the recess 75. In this position, the width W4 of the alignment knob 71 mates to the width W4 of the recess 75 such that the hole 55 aligns with the hole 59.

In this embodiment precision horizontal alignment in the y-direction may be achieved by controlling the width and placement of dimension W4 on both the plug 15 and the receptacle 13, and providing that the length of the alignment knob 71 equals or exceeds the receiving depth of the recess 75. Thus, the plug width W1 does not need to be very precise for proper horizontal alignment and its tolerance may be significantly relaxed so long as W1 is less than the channel width W3. Given these constraints, and under a retaining force from the pawl 29 acting in the x-direction against the retaining bracket 51, the plug 15 may be held firmly in horizontal alignment with the receptacle 13 as the recess 75 is guided into full engagement with the alignment knob 71.

The retaining bracket 51 also includes a leading edge 77 and a trailing edge 79. One or both of these edges may be sloped in the x-z plane. The height of the retaining bracket 51 above the plug 15 may be configured such that during insertion of the plug, the leading edge 77 initially contacts the tapered end 33 of the pawl 29 when the pawl 29 is unloaded. As the plug 15 is inserted further into the receptacle 13, the tapered end 33 slides up the leading edge 77, spring-loading the pawl 29, until the barbed edge 34 passes over the top of the bracket 51. At this point, the barbed edge 34 slides down the trailing edge 79, transmitting the retaining force through the retaining bracket 51 in the x-direction for horizontal alignment and through the retaining bracket 51 and/or the plug 15 in the z-direction for vertical alignment.

Referring now to FIGS. 2 and 3, the plug 15 is shown in a fully engaged position within the receptacle 13, with the barbed edge 34 of the pawl 29 spring-locked against the trailing edge 29 of the retaining bracket 51. The vertical component of the retaining force F1 allows a channel contacting surface 52 of the plug 15 to engage the planar surface 27 of the channel 25. In this example, the channel contacting surface 52 may be a foot or rail extending downward from the bottom planar surface 50. The foot or rail 52 may be formed with a bottom edge or bottom surface designed to slide smoothly along the channel 25.

In the fully engaged position, the channel contacting surface 52 is pressed flush against the channel 25 to reduce the number of dimensional controls needed for vertical alignment, down to a single vertical dimension on the plug 15 or the receptacle 13. For example, provided that height H between a centerline 80 and the bottom of the channel contacting surface 52 is controlled to a desired accuracy, force F1 provides that at full engagement, the plug 15 vertically aligns to a properly dimensioned receptacle. Concurrently, provided that height H between a centerline 80 and the planar surface 27 is controlled to a desired accuracy, force F1 provides that the receptacle 13 vertically aligns to a properly dimensioned plug. Alternatively, the plug 15 may be formed without the foot or rail 52, in which case the bottom planar surface 50 becomes the channel contacting surface. A foot or rail may be preferred, however, to minimize frictional forces.

With a connector assembly 11 configured as in any of the disclosed embodiments, alignment of a first signal line running through the receptacle to a second signal line running through the plug may be accomplished with high precision in the x, y and z dimensions. Moreover, this precision may be achieved by reducing control dimensions in the y-direction to a single height dimension. This significantly simplifies manufacturing as compared to typical prior art methods that require control of up to four vertical dimensions (i.e. spatial placement of the four corners of a trapezoid) to ensure proper configuration. Thus, the invention is advantageous for fiber optic connectors needing very high precision, for example, on the order of about 10 µm to about 100 µm. In another embodiment acceptable alignment of the optical fibers may be ensured by maintaining a spacing tolerance of each fiber end within the plug or receptacle at about +/−0.001 inch for the spatial dimensions under control.

A further advantage of a fiber optic connector configured according to the invention is excellent coupling with minimal insertion loss. In one embodiment, as shown in FIGS. 2-6, the assembly may be equipped with signal lines that are optical fibers routed through holes 55 and 59. The connector assembly 11 includes a first fiber optic line extending through an alignment knob in the baffle 53 until the end of the optical fiber is flush with the end of the alignment knob furthest from the baffle 53. A second fiber optic line extends through the plug 15 until flush with the inner wall of a recess 75. When the alignment knob and the recess engage under the retaining force, the optical lines are coupled and aligned with high precision. This may be achieved without the use of a coupling fluid or gel that can cause additional problems such as end gaps or concentric offset. Coupling optical fibers according to the invention is therefore less susceptible to insertion loss from various forms of misalignment.

With reference again to FIG. 3, a release force F2 and a restoring force F3 of the present invention are now described. In one embodiment, the retaining bracket 51 is configured with a trailing edge 79 that slopes upward in the x and z directions from the top side 49 of the plug 15. The degree of this slope may be varied from between about 0 and 90 degrees, preferably between about 20 and 60 degrees, to allow the barbed edge 34 of the pawl 29 to slide up the slope in the presence of a shock or pulling force tending to separate a fully engaged plug 15 and receptacle 13. The minimum force needed to completely separate a fully engaged connection is the release force F2, which acts in the x-direction. Complete separation means that the barbed edge 34 has been unlocked from the retaining bracket 51, i.e. displaced to a point on the leading edge 77 or further away from the retaining bracket 51 where the spring force has been removed from the pawl 29 and the connector is no longer fully engaged.

The degree of the slope, the contacting angle of the barbed edge 34, the materials of construction, and the spring force are all determining factors for establishing a release force for the connector assembly 11. In one embodiment, the spring-loaded pawl 29 of the receptacle 13 may be releasably lockable to the retaining bracket 51. This means that release force F2 may be established to allow the connector assembly to be pulled apart by hand without undue difficulty, and yet provide a reliable long-term connection that maintains the pawl 29 locked to the retaining bracket 51 in the absence of a separating force. In one embodiment, the release force may be set to be between about 0.5 pounds and about 10.0 pounds. In another embodiment, the release force may be set to be between about 3.0 pounds and about 8.0 pounds. In another embodiment, the release force may be set at about 1.0 pound.

A connector provides a restoring force F3 acting in the x-direction that tends to reconnect and realign the plug 15 within the receptacle 13 in the event of a partial separation. A partial separation may occur if a shock or pulling force tending to separate the plug 15 from the receptacle 13 is less than the release force. During a partial separation event, the barbed edge 34 may slide part way up the slope of the trailing edge 79 or even to the top surface of the retaining bracket 51, without complete separation. In this case, the anchoring end 35 of the pawl 29 rotates downward to compress the spring 43, causing a reaction force from the spring 43 that pushes back against the anchoring end. When the shock or pulling force is removed, the reaction force F3 causes the tapered end 33 of the pawl 29 to rotate downward against the trailing edge 79 of the retaining bracket 51, thereby reestablishing force vector F1 to realign and reconnect the plug 15 to the receptacle 13. Thus, a connector assembly 11 advantageously provides a mass-spring suspension system for automatically restoring proper alignment in response to shock.

The invention provides particular advantages in medical instrument applications. For example, when coupling electronic instruments to catheters equipped with electronic or optical sensors, it is important to make and break the coupling without placing undue tension on the catheter installation to prevent displacement of the installation or patient discomfort. In an accident scenario, where the instrument coupled to the catheter gets moved or falls from a bench or hospital bed causing tension on the catheter, the release force allows the electrical or optical connection to break first to preserve the integrity of the catheter installation. With the connector assembly in a latched state, a component of the spring force may resiliently push the proximal end of the catheter plug horizontally against the distal end of the instrument receptacle, thereby coupling the optical fibers in optimal alignment under static conditions, and providing a restoring force to restore the optimal alignment after mechanical shock. To allow for the integrity of the catheter installation, the release force of the locking mechanism may be established between about one and about twenty times less than a target force, where the target force may represent an approximate force needed to pull the catheter out of the patient, displace the catheter, or cause undue patient discomfort. In another embodiment, the release force may be set in the range of about five and about ten times less than the target. In another embodiment, the release force may be set to about eight times less than the target force.

The invention has been disclosed in an illustrative manner. Accordingly, the terminology employed throughout should be read in an exemplary rather than a limiting manner, Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A receptacle for coupling signal lines, the receptacle having a terminating end for terminating a first signal line and a receiving end for receiving a plug carrying a second signal line, the receptacle comprising:
    a housing defining a channel having a planar surface disposed in the receiving end;
    a spring-loaded pawl mounted to the housing, wherein when the plug is positioned in the channel, the pawl maintains a retaining force on the plug, the retaining force having a first component normal to the planar surface and a second component parallel to the planar surface to properly align the second signal line to the first signal line; and
    a baffle positioned between the terminating end and the receiving end and extending in a direction substantially normal to the planar surface of the channel, the first signal line extending through the baffle;
    wherein the baffle further comprises an alignment knob extending into the channel; and
    wherein the alignment knob comprises sloped sides that form a minimum width where the alignment knob extends furthest from the baffle.

2. A receptacle for coupling signal lines, the receptacle having a terminating end for terminating a first signal line and a receiving end for receiving a plug carrying a second signal line the receptacle comprising:
    a housing defining a channel having a planar surface disposed in the receiving end;
    a spring-loaded pawl mounted to the housing, wherein when the plug is positioned in the channel, the pawl maintains a retaining force on the plug, the retaining force having a first component normal to the planar surface and a second component parallel to the planar surface to properly align the second signal line to the first signal line; and a baffle positioned between the terminating end and the receiving end and extending in a direction substantially normal to the planar surface of the channel, the first signal line extending through the baffle;

wherein the baffle further comprises an alignment knob extending into the channel; and wherein the first signal line extends through the alignment knob.

3. The receptacle of claim 2, wherein the first signal line and the alignment knob comprise a planar engagement surface at the minimum width of the alignment knob.

4. The receptacle of claim 1, wherein at least a portion of the channel comprises angled walls that form a maximum channel width at a position furthest from the baffle.

5. A receptacle for coupling signal lines, the receptacle having a terminating end for terminating a first signal line and a receiving end for receiving a plug carrying in a second signal line, the receptacle comprising:

a housing defining a channel having a planar surface disposed in the receiving end;

a spring-loaded pawl mounted to the housing, wherein when the plug is positioned in the channel, the pawl maintains a retaining force on the plug, the retaining force having a first component normal to the planar surface and a second component parallel to the planar surface to properly align the second signal line to the first signal line wherein the pawl is rotatable about an axis transverse to the channel.

6. The receptacle of claim 5, further comprising a compression spring disposed within the housing for loading the rotatable pawl.

7. The receptacle of claim 5, wherein the pawl comprises a tapered end for guiding the plug into the channel.

8. The receptacle of claim 7, wherein the tapered end of the pawl includes a barbed edge for transmitting the retaining force to the plug.

9. The receptacle of claim 5, wherein the signal lines comprise optical fibers.

10. A connector assembly for coupling fiber optic lines, comprising:

a receptacle, including
  a terminating end for terminating a first fiber optic line,
  a receiving end defining a channel having a planar surface disposed therein,
  a baffle positioned between the terminating end and the receiving end and extending in a direction normal to the planar surface of the channel, the first fiber optic line extending through the baffle, and
  a spring-loaded pawl; and a plug, including
  a terminating end for terminating a second fiber optic line,
  an insertion end for insertion into the receptacle, the second fiber optic line extending through the insertion end,
  a contacting surface for contacting the planar surface of the channel, and
  a retaining bracket for engaging the spring-loaded pawl;

wherein, when the contacting surface of the plug slides into the channel of the receptacle, the spring-loaded pawl locks to the retaining bracket, creating a retaining force holding the contacting surface against the channel and the insertion end against the baffle, thereby retaining the second fiber optic line in proper alignment with the first fiber optic line; and wherein the baffle further comprises an alignment knob extending into the channel, and the insertion end further comprises a recess configured to receive the alignment knob when the insertion end abuts the baffle.

11. The connector assembly of claim 10, wherein the recess comprises sloped sides that form a maximum recess width at an outer edge of the insertion end and a minimum recess width along an inner wall of the recess nearest the terminating end.

12. The connector assembly of claim 11, further comprising
  the first fiber optic line extending though the alignment knob until flush with an end of the alignment knob furthest from the baffle, and
  the second fiber optic line extending through the plug until flush with the inner wall of the recess.

13. The connector assembly of claim 12, wherein, in the proper alignment, the alignment knob end furthest from the baffle abuts the inner wall of the recess, coupling the first fiber optic line to the second fiber optic line such that insertion loss between the fiber optic lines is minimized.

14. A connector assembly, for coupling fiber optic lines, comprising;

a receptacle, including
  a terminating end for terminating a first fiber optic line,
  a receiving end defining a channel having a planar surface disposed therein,
  a baffle positioned between the terminating end and the receiving end and extending in a direction normal to the planar surface of the channel, the first fiber optic line extending through the baffle, and
  a spring-loaded pawl; and a plug, including
  a terminating end for terminating a second fiber optic line,
  an insertion end for insertion into the receptacle, the second fiber optic line extending through the insertion end,
  a contacting surface for contacting the planar surface of the channel, and
  a retaining bracket for engaging the spring-loaded pawl;

wherein, when the contacting surface of the in slides into the channel of the receptacle, the spring-loaded pawl locks to the retaining bracket, creating a retaining force holding the contacting surface against the channel and the insertion end against the baffle, thereby retaining the second fiber optic line in proper alignment with the first fiber optic line; and wherein the pawl is rotatable about an axis transverse to the channel.

15. The connector assembly of claim 14, further comprising a compression spring disposed within the receptacle for loading the rotatable pawl.

16. A connector assembly for coupling fiber optic lines, comprising:

a receptacle, including
  a terminating end for terminating a first fiber optic line,
  a receiving end defining a channel having a lanai surface disposed therein,
  a baffle positioned between the terminating end and the receiving end and extending in a direction normal to the planar surface of the channel, the first fiber optic line extending through the baffle, and
  a spring-loaded pawl; and a plug, including
   a terminating end for terminating a second fiber optic line,
   an insertion end for insertion into the receptacle the second fiber optic line extending through the insertion end,
   a contacting surface for contacting the planar surface of the channel, and
   a retaining bracket for engaging the spring-loaded pawl;
wherein, when the contacting surface of the plug slides into the channel of the receptacle, the spring-loaded pawl locks to the retaining bracket, creating a retaining force holding the contacting surface against the channel and the insertion end against the baffle, thereby retaining the second fiber optic line in proper alignment with the first fiber optic line; and
wherein the pawl comprises a tapered end for guiding the plug into the channel, the tapered end including a barbed edge for transmitting the retaining force.

17. A fiber optic connector for coupling an optical instrument to an optical catheter, comprising:
   a receptacle, including
      a terminating end for terminating optical fiber from the optical instrument,
      a receiving end, the optical fiber from the optical instrument extending to the receiving end,
      a spring-loaded pawl; and
   a plug, including
      a terminating end for terminating optical fiber from the optical catheter,
      an insertion end for insertion into the receiving end of the receptacle, the optical fiber from the optical catheter extending through the insertion end, and
      a retaining bracket for engaging the spring-loaded pawl;
   wherein, with the insertion end of the plug fully inserted into the receiving end of the receptacle, the spring-loaded pawl releasably locks to the retaining bracket, imparting a retaining force that maintains the optical fibers in proper alignment.

18. The fiber optic connector of claim 17, wherein, responsive to shock below a release force, the spring-loaded pawl imparts a restoring force on the plug to restore the optical fibers to the proper alignment.

19. The fiber optic connector of claim 18, wherein, responsive to tension at or above the release force, the spring-loaded pawl releases the plug from the receptacle.

20. The fiber optic connector of claim 19, wherein the release force is between about one-half pound and about ten pounds.

* * * * *

UNITED STATES PATENT AND TRADEMARK OFFICE
CERTIFICATE OF CORRECTION

PATENT NO. : 7,654,849 B2 Page 1 of 1
APPLICATION NO. : 12/049125
DATED : February 2, 2010
INVENTOR(S) : Mark G. Gordon and Weldon D. West It is certified that error appears in the above-identified patent and that said Letters Patent is hereby corrected as shown below:

Column 10, in claim 16, at line 61, delete "lanai", and insert --planar--.

Signed and Sealed this

Eighth Day of June, 2010

David J. Kappos
*Director of the United States Patent and Trademark Office*